US005252421A

United States Patent [19]

Ichimura et al.

[11] Patent Number: 5,252,421

[45] Date of Patent: Oct. 12, 1993

[54] ELECTROPHOTOGRAPHIC TONER

[75] Inventors: Masanori Ichimura; Toru Murakami; Koichi Oyamada, all of Kanagawa, Japan

[73] Assignee: Fuji Xerox Co., Ltd., Tokyo, Japan

[21] Appl. No.: 655,189

[22] Filed: Feb. 13, 1991

Related U.S. Application Data

[63] Continuation of Ser. No. 376,516, Jul. 7, 1989, abandoned.

[30] Foreign Application Priority Data

Jul. 18, 1988 [JP] Japan ............................. 63-176944

[51] Int. Cl.[5] ........................ G03G 9/00; G03G 5/00; C08L 91/08; C08K 5/01

[52] U.S. Cl. ................................ 430/110; 430/109; 430/111; 430/137; 524/489

[58] Field of Search ..................... 430/109, 110, 111; 524/489

[56] References Cited

U.S. PATENT DOCUMENTS

| | | | |
|---|---|---|---|
| 3,775,326 | 11/1973 | Westdale | 430/109 X |
| 4,659,641 | 4/1987 | Mahalek et al. | 430/137 |
| 4,833,057 | 5/1989 | Misawa et al. | 430/137 |
| 4,849,316 | 7/1989 | Kawaski et al. | 430/110 X |
| 4,885,176 | 12/1989 | Nakakura et al. | 426/19 |
| 4,912,010 | 3/1990 | Mori et al. | 430/137 |
| 5,145,762 | 9/1992 | Grushkin | 430/137 |

FOREIGN PATENT DOCUMENTS

| | | | |
|---|---|---|---|
| 2909357 | 9/1979 | Fed. Rep. of Germany | 430/110 |
| 0084460 | 5/1982 | Japan | 430/110 |
| 2070029 | 9/1981 | United Kingdom | 430/110 |

*Primary Examiner*—Marion E. McCamish
*Assistant Examiner*—Steve Crossan
*Attorney, Agent, or Firm*—Finnegan, Henderson, Farabow, Garrett & Dunner

[57] ABSTRACT

An electrophotographic is disclosed, comprising a binder resin, a coloring material, and a polyalkylene, wherein the polyalkylene has an average particle volume of 0.05 $\mu m^3$ or more. The toner exhibits broadened fixing latitude when fixed by heat roll fixing without using any offset inhibiting liquid.

9 Claims, 3 Drawing Sheets

ELECTROPHOTOGRAPHIC TONER

This application is a continuation of application Ser. No. 07/376,516 filed Jul. 7, 1989 now abandoned.

FIELD OF THE INVENTION

The present invention relates to a toner for developing an electrostatic latent image in electrophotography, electrostatic recording and electrostatic printing.

BACKGROUND OF THE INVENTION

In the reproduction of originals by transfer of an electrostatic image, an electrostatic latent image is formed upon a photoreceptor or an electrostatic film. Fine powder, called a toner, comprising a coloring material dispersed in a binder resin is adhered to the latent image to enable it to be seen. The resulting toner image is transferred to a transfer substrate such as paper. The transferred image is then fixed, for example, by applying heat, to thereby obtain a copy. Fixing of the toner image may be effected by solvent treatment or top coating treatment, but thermal fixing is generally employed, in which the toner image is heated to a temperature sufficient to fuse the toner onto the substrate. With the recent increase of copying speed, a so-called heat roll fixing technique is commonly used, comprising passing a substrate having a toner image formed thereon through a pair of rolls composed of a heat roll and a press roll to effect heat pressing.

The heat roll fixing is considered an extremely effective method for toner fixing because it achieves higher thermal efficiency with reduced heat dispersion to rapidly accomplish fixing as compared with other thermal fixing methods. However, since the heat roll or press roll directly contacts the toner image, a part of the toner on the substrate may adhere to the roll, which may cause an offset phenomenon.

The offset phenomenon has been dealt with by coating the roll surface with a releasant, such as fluorine-containing resins, and supplying an offset inhibiting liquid, such as silicone oil, to the surface of the coated roll. This countermeasure, though effective to prevent the offset phenomenon, is accompanied by disadvantages, such as requiring an additional apparatus for supplying the offset inhibiting liquid to the roll surface at a constant feed rate, oil leaks may occur, and the offset inhibiting liquid gives off an odor upon heating.

Hence, attempts have recently been made to carry out heat roll fixing without using an offset inhibiting liquid as described, e.g., in JP-B-53-5549 (the term "JP-B" as used herein means an "examined published Japanese patent application"). Various improvements in toner particles per se have also been proposed for the purpose of eliminating the necessity of the offset inhibiting liquid as described, e.g., in JP-B-52-3304, JP-B-58-58664, JP-A-56-154740 and JP-A-57-8549 (the term "JP-A" as used herein means an "unexamined published Japanese patent application").

In cases where use of an offset inhibiting liquid is omitted by incorporating a polyalkylene resin in a toner composition as proposed in the conventional methods as described JP-B-52-3304, the toner in which the polyalkylene resin is merely incorporated shows a narrow range of temperature at which fixing is feasible (fixing latitude).

SUMMARY OF THE INVENTION

One object of the present invention is to provide a toner which exhibits greater fixing latitude (the term "fixing latitude" means a temperature region between a lowest fixing temperature and a hot offset temperature) than results from merely incorporating a polyalkylene resin during fixing by means of fixing rolls without supplying an offset inhibiting liquid to the roll surface. In other words, the object is to provide a toner which has a broadened fixing temperature range as a result of shifting of the upper limit (high temperature causing offset) to the higher side (i.e., the upper limit of the offset temperature is shifted to from 200° to 250° C.), with the lower limit (lowest fixing temperature: the lowest fixing temperature required for satisfying a desired fixing strength, for example, having the relationship, "cold offset temperature≦lowest fixing temperature≦hot offset temperature") being unchanged.

It has now been found that the above object of the present invention can be accomplished by an electrophotographic toner comprising a binder resin, a coloring material and a polyalkylene, wherein the polyalkylene has an average particle volume of 0.05 $\mu m^3$ or more.

BRIEF DESCRIPTION OF THE DRAWINGS

The present invention will be described by reference to the accompanying drawing wherein:

FIG. 1-(*b*) shows a maximum horizontal length of the individual polyalkylene particles in the toner particle of FIG. 1-(*a*);

DETAILED DESCRIPTION OF THE INVENTION

The terminology "average particle volume" as used throughout the specification and claims means a value calculated as described below.

Figure 1A:
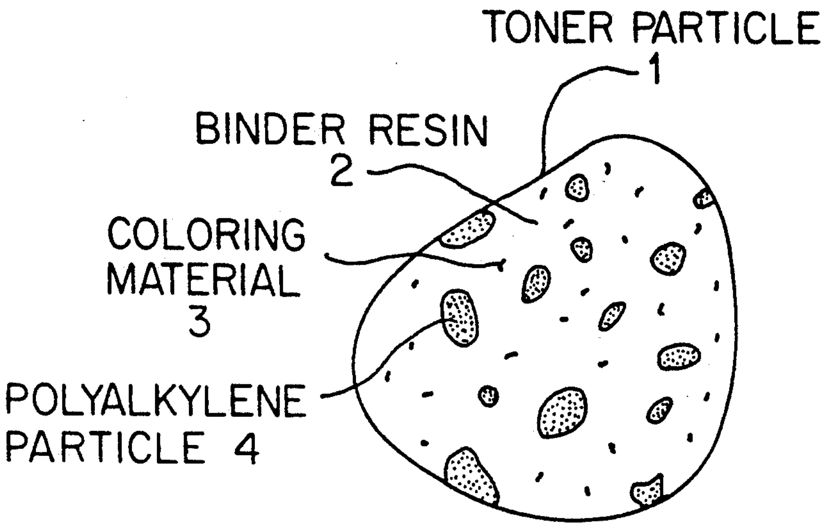
FIG. 1-(*a*) schematically illustrates the structure of the toner particle according to this invention.
Figure 1B:

Individual toner particles are embedded in an appropriate binder, e.g., an epoxy resin. One of the particles is cut nearly in the center by a diamond cutter, and the cut surface is sliced off to a thickness of about 0.1 $\mu m$. The slice is photographed by the use of transmission electron microscope (TEM) at a magnification of 15,000. The resulting electron micrograph shows a structure as schematically illustrated in FIG. 1-(*a*), wherein the numeral 1 indicates a toner particle; 2, binder resin; 3, coloring material; and 4, polyalkylene particles. The polyalkylene particles can be easily distinguished by contrast.

The maximum horizontal length (FIG. 1-(*b*)) of the individual polyalkylene particles was measured by means of an image analyzer "Omnicon 3500 Model", manufactured by Shimazu Seisakusho Ltd. An average horizontal length $\bar{x}$ is obtained from ten largest measured values $\bar{x}1$, $\bar{x}2$, $\bar{x}3$ . . . $\bar{x}10$ by equation:

$$x = \frac{x1 + x2 + x3 + \ldots x10}{10}$$

Assuming the individual polyalkylene particles to be spheres, an average particle volume $\bar{y}$ of the ten polyalkylene particles per toner particle can be calculated form the equation:

$$\bar{y}=4/3\pi(\bar{x}/2)^3$$

Measurement of the average particle volume of polyalkylene particles $\bar{y}$ is made for 10 toner particles to obtain $\bar{y}1$, $\bar{y}2$, $\bar{y}3$ . . . $\bar{y}10$, and the average $\bar{y}$ can be calculated by equation:

$$\bar{\bar{y}} = \frac{\bar{y}1 + \bar{y}2 + \bar{y}3 + \ldots \bar{y}10}{10}$$

In the present invention, the average particle volume of the polyalkylene particles should be at least 0.05 $\mu m^3$, and this value can be adjusted by controlling the temperature during kneading with a binder resin as hereinafter described. Preferably, the average particle volume of the polyalkylene particles is in the range of 0.05 $\mu m^3$ to 50 $\mu m^3$, and most preferably in the range of from 0.1 $\mu m^3$ to 5 $\mu m^3$.

The polyalkylenes which can be used in the present invention preferably include polyethylene having a weight average molecular weight (Mw) of preferably from 1,500 to 6,000 (more preferably from 2,000 to 6,000) and polypropylene having an Mw of preferably from 3,000 to 6,000 (more preferably from 4,000 to 6,000).

The polyalkylenes are used in an amount of preferably from 1 to 20 parts by weight, more preferably from 2 to 15 parts by weight and most preferably from 3 to 12 parts by weight, per 100 parts by weight of the total toner components. Suitable homopolymers and copolymers of the above polyalkylenes can be mixed with a binder resin at kneading step to prepare the toner particles.

The binder resin to be used in the present invention can be selected from among thermoplastic resins without any particular limitation. Examples of usable thermoplastic resins include homopolymers or copolymers of styrenes, e.g., styrene and chlorostyrene; monoolefins, e.g., ethylene, propylene, butylene and isobutylene; vinyl esters, e.g., vinyl acetate, vinyl propionate, vinyl benzoate, and vinyl butyrate; α-methylene aliphatic monocarboxylic acid esters, e.g., methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate; vinyl ethers, e.g., vinyl methyl ether, vinyl ethyl ether, and vinyl butyl ether; and vinyl ketones, e.g., vinyl methyl ketone, vinyl hexyl ketone, and vinyl isopropenyl ketone. Typical examples of these binder resins are polystyrene, styrene-alkyl acrylate copolymers, styrene-alkyl methacrylate copoylmers, styrene-acrylonitrile copolymers, styrene-butadiene copolymers, and styrene-maleic anhydride copolymers. In addition, resins used as polyester, polyurethane, epoxy resins, silicone resins, polyamide, and modified resins may also be preferably employed.

The coloring material which can be used in the toner typically may be selected from carbon black, Nigrosine, Aniline Blue, Charchoyl Blue, Chrome Yellow, Ultramarine Blue, du Pont Oil Red, Quinoline Yellow, Methylene blue chloride, Phthalocyanine Blue, Malachite Green oxalate, lamp black, Rose Bengale, C.I. Pigment Red 48:1, C. I. Pigment Red 122, C. I. Pigment Red 57:1, C. I. Pigment Yellow 97, C. I. Pigment Yellow 12, C. I. Pigment L. Blue 15:1, and C. I. Pigment Blue 15:3.

The binder resin and coloring material to be used in the present invention are not limited to the above-enumerated examples. If desired, the toner of the present invention may further contain an internal charge control agent or a magnetic powder.

The toner of the present invention can be prepared by melt-kneading the above-described low-molecular weight polyalkylene, binder resin, and coloring material at an temperature of preferably from 130° to 250° C., more preferably from 140° to 240° C. and most preferably from 150° to 230° C., cooling the mixture to solidify, and then grinding the solid.

As mentioned above, the average particle volume of the polyalkylene can be adjusted to the desired value by controlling constantly the kneading temperature (i.e., preferably from 130° to 250° C., more preferably from 140° to 240° C. and most preferably from 150° to 230° C.) while adding a small amount of water and heating a kneading chamber.

The average particle size of the toner is generally less than about 30 $\mu m$, preferably from 3 to 20 $\mu m$ and particularly preferably from 6 to 14 $\mu m$.

When the area of the toner particle surface occupied by the polyalkylene is extremely increased by the increase of the average particle volume of the polyalkylene, the flowability of the toner particles tends to be decreased. In this case, the toner particles may be coated with external particles including, for example, silica particles, hydrophobic silica particles, metal oxide particles, polyvinylidene fluoride particles, and methyl polymethacrylate particles to improve the flowability of the toner particles.

An amount of the external particles used is generally from 0.05 to 20 wt % and preferably from 0.1 to 5 wt %, based on the toner particles, and further the most preferred external particles are silica particles and hydrophobic silica particles.

The toner according to the present invention may be used either alone as a one-component-system developer or in combination with a carrier as a two-component system developer.

The carrier to be combined with the toner in two-component-system developers have an average particle size of up to 500 $\mu m$ and may be any of known carriers, e.g., iron, nickel, cobalt, iron oxide, ferrite, glass beads, and granular silicon. The surface of the carrier may be coated, e.g., with a fluorine-containing resin, an acrylic resin, a silicone resin, etc.

The toner according to the present invention is useful for development of an electrostatic latent image formed on a photoreceptor comprising an inorganic photoconductive material (e.g., selenium, zinc oxide, cadmium sulfide, or amorphous silicon) or an organic photoconductive material (e.g., a phthalocyanine pigment or a bisazo pigment) or an electrostatic recording material having a dielectric film, e.g., of polyethylene terephthalate. That is, an electrostatic latent image is formed on the photoreceptor through an electrophotographic process of on the electrostatic recording material by use of multistylus, and the toner is adhered to the latent image by magnetic brush development, cascade development or a like developing method to form a toner image. The toner image is transferred to a transfer material, e.g., paper, followed by fixing to obtain a copy. The toner remaining on the surface of the photoreceptor, etc. is cleaned off by various methods, such as blade cleaning, brush-cleaning, web cleaning, and roll cleaning.

The present invention is now illustrated in greater detail by way of the following Examples, but it should be understood that the present invention is not deemed to be limited thereto. In these examples, all the parts are by weight unless otherwise indicated.

EXAMPLE 1

| | |
|---|---|
| Polypropylene (Mw: 6,000) | 6 parts by weight |
| Styrene-n-butyl acrylate crosslinked copolymer (65/35 by weight) | 84 parts by weight |
| C.I. Pigment Red 48:1 ("Symuler Neothol Red 2BY", produced by Dai-Nippon Ink & Chemicals, Inc.) | 10 parts by weight |

Four portions of the above components were each melt-kneaded at different resin temperature of 140° C., 160° C., 180° C., and 200° C., cooled to solidify, finely ground, and then classified to obtain red particles having an average particle size of 12 μm. The kneading temperature for each portion was set by controlling the amount of water added for kneading and the heating temperature of the kneading chamber.

For each portion, to the resulting particles (100 parts) was added 0.5 part of a silica fine powder having an average particle size of 20 μm, and the mixed particles were mixed in V-type mixer (i.e., twin-cylinder mixer) for 10 minutes.

Figure 2:
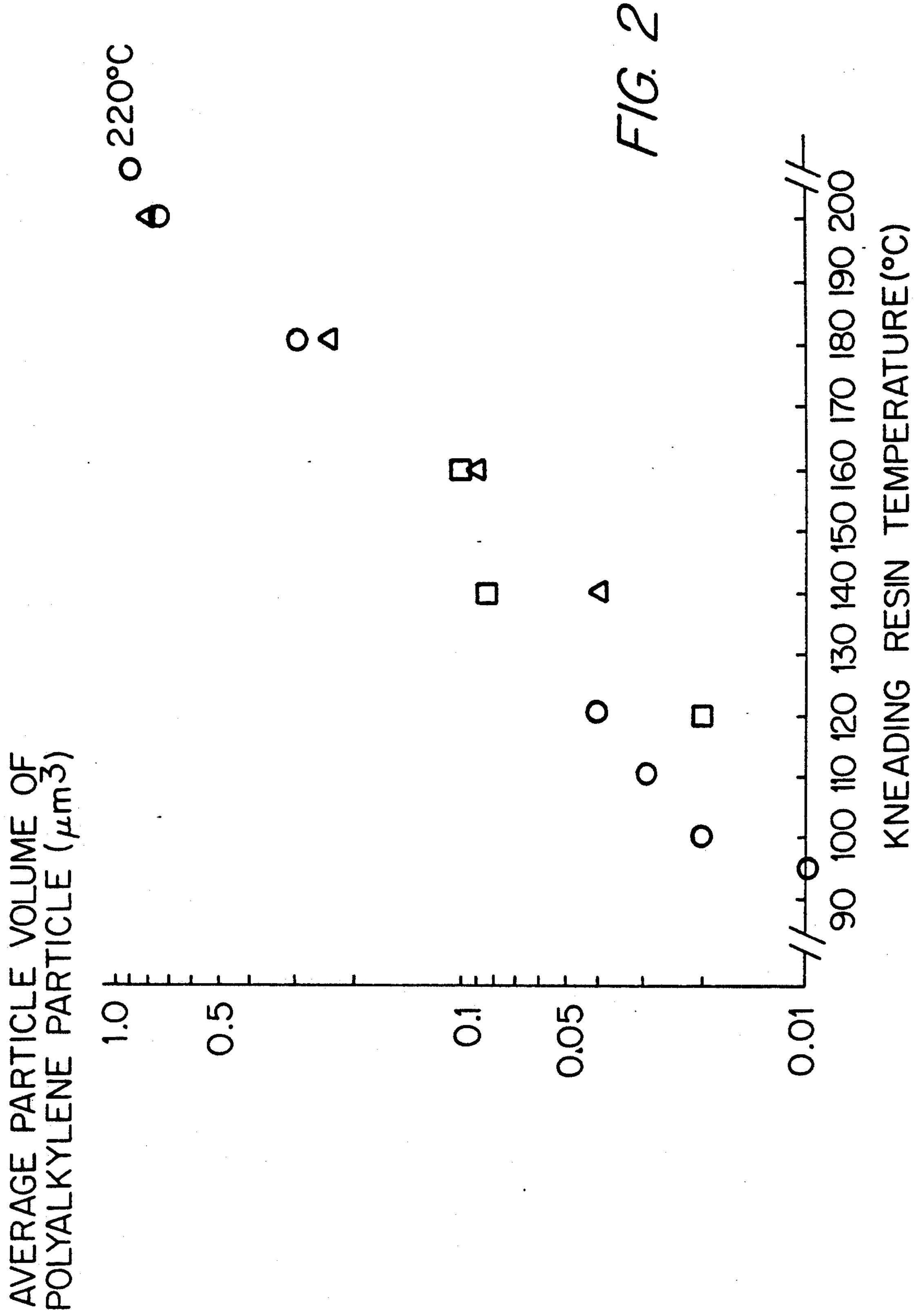
FIG. 2 is a graph of average particle volume of polyalkylene particles on the vertical axis vs. kneading resin temperature on the horizontal axis.

An average particle volume $\bar{y}$ of the low-molecular polypropylene particles in each of the resulting four kinds of toners was determined. FIG. 2 illustrates the plot of $\bar{y}$ against the kneading resin temperature (marked with Δ).

Five parts of each toner were mixed with 95 parts of a steel shot carrier to prepare a developer. Copying was carried out using a copying machine "FX-3870" manufactured by Fuji Xerox Co., Ltd., and the aboveprepared developer. The toner image was transferred to transfer paper and then fixed at varying fixing heat roll temperatures which increased from 160° to 250° C. in increments of 5° C. The fixing temperature at which the toner was not fixed on the paper and easily rubbed off with an eraser was taken as lowest fixing temperature. The fixing temperature at which the toner was transferred to the heat roll and then transferred to the next transfer paper, i.e., the temperature causing an offset phenomenon was taken as the high offset temperature.

Figure 3:
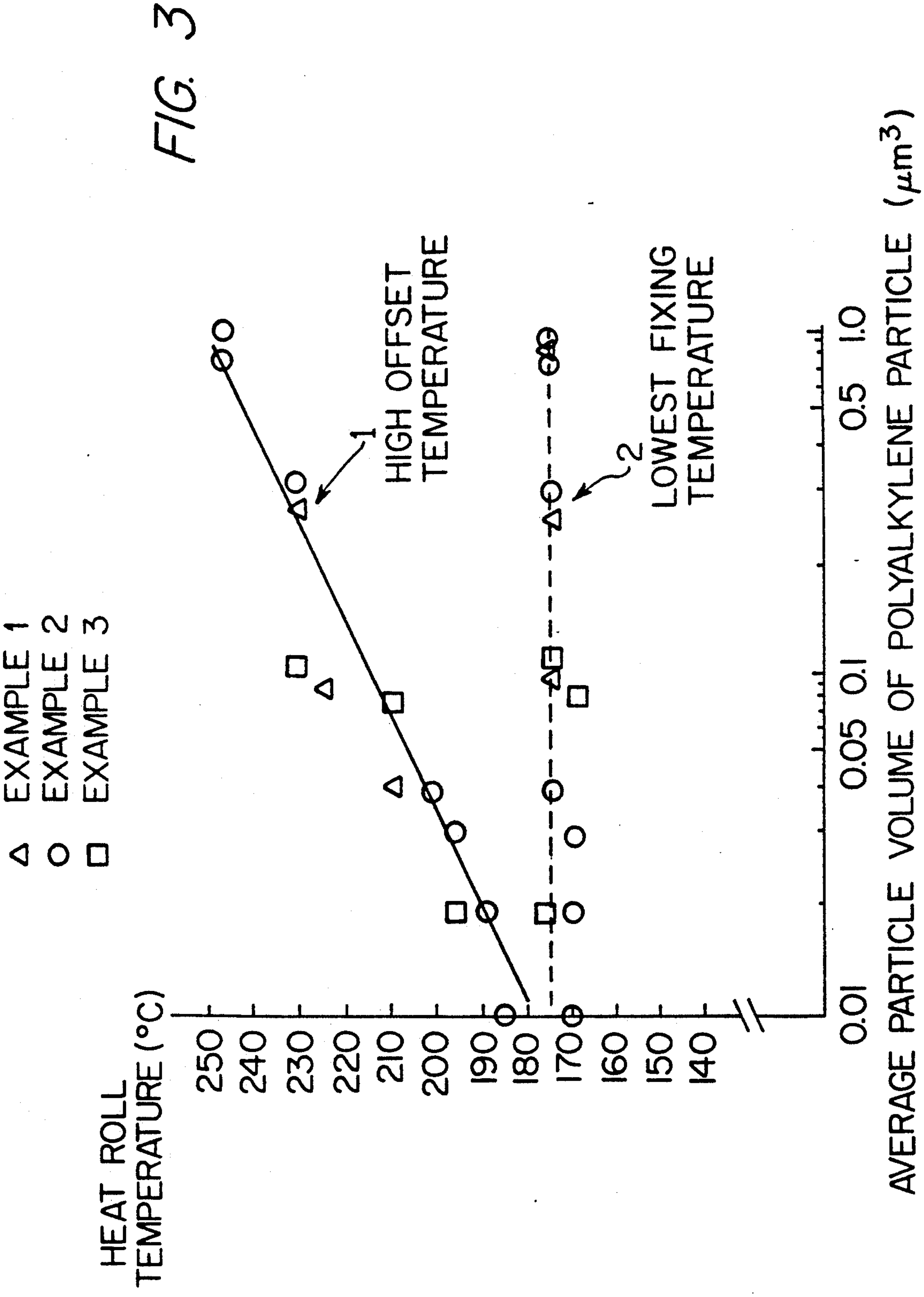
FIG. 3 is a graph of average particle volume of polyalkylene particles on the horizontal axis vs. heat roll temperature on the vertical axis.

The lowest fixing temperature and high offset temperature were plotted against the average particle volume $\bar{y}$ of the low-molecular polyalkylene in FIG. 3 (marked with Δ). In FIG. 3, the line 1 indicates the high offset temperature, and the line 2 indicates the lowest fixing temperature.

| | |
|---|---|
| Polyester resin obtained from terephthalic acid and 2,2-dimethyl-1,3-propanediol (a number average molecular weight: 6,000) | 81 parts by weight |
| Carbon black | 10 parts by weight |
| Polypropylene (Mw: 3,000) | 9 parts by weight |

Portions of the above components were each kneaded at different resin temperatures of 95° C., 100° C., 110° C., 120° C., 180° C., 200° C., and 220° C., ground, and then classified to obtain particles having an average particle size of 12 μm. A silica fine powder was added to each portion as an external additive, and each resulting toner was mixed with a steel shot carrier in the same manner as in Example 1 to prepare a developer. Each developer was evaluated in the same manner as in Example 1, and the results obtained are shown in FIG. 3 (marked with ○).

EXAMPLE 3

| | |
|---|---|
| Styrene-n-butyl acrylate copolymer | 79 parts by weight |
| Carbon black | 10 parts by weight |
| Low-moleuclar polyethylene (Mw: 3,000) | 11 parts by weight |

Portions of the above components were each kneaded at different resin temperatures of 120° C., 140° C., and 160° C. A developer was prepared by using the resulting particles in the same manner as in Example 2 and evaluated in the same manner as in Example 1. The results obtained are shown in FIG. 3 (marked with □).

As is apparent from the results shown in FIG. 3, the electrophotographic toner according to the present invention has a difference between the lowest fixing temperature and the high offset temperature, i.e., fixing latitude, of 30° C., or more under a fixing condition of using no offset inhibiting liquid. Even taking possible temperature variation of the fixing heat roll per se into consideration, the toner of the present invention proved to sufficiently withstand practical use.

While the invention has been described in detail and with reference to specific embodiments thereof, it will be apparent to one skilled in the art that various changes and modifications can be made therein without departing from the spirit and scope thereof.

What is claimed is:

1. A method for preparing an electrophotographic toner comprising a binder resin, a coloring material, and a polyalkylene, which comprises the steps of:

(1) melt-kneading a mixture comprising the polyalkylene, the binder resin and the coloring material, wherein the average particle volume of the polyalkylene is adjusted to 0.05 $\mu m^3$ or more by controlling the kneading temperature to a temperature in the range of from about 130° to about 250° C., and control of the kneading temperature is effected by controlling the amount of water added for kneading and the heating temperature of the kneading chamber;

(2) cooling the melt-kneaded mixture to solidify; and (3) reducing the solidified mixture to powder or small fragments.

2. The method for preparing an electrophotographic toner as claimed in claim 1, wherein the polyalkylene is polypropylene having a weight average molecular weight of from 3,000 to 6,000 or polyethylene having a wight average molecular weight of from 1,500 to 6,000.

3. The method for preparing an electrophotographic toner as claimed in claim 1, wherein the average particle volume of the polyalkylene is adjusted to 0.05 $\mu m^3$ to 50 $\mu m^3$.

4. The method for preparing an electrophotographic toner as claimed in claim 1, wherein the polyalkylene is used in an amount of from 1 to 20 parts by weight per 100 parts by weight of the total toner components.

5. The method for preparing an electrophotographic toner as claimed in claim 1, wherein controlling the kneading temperature to adjust the average particle volume of the polyalkylene to 0.05 $\mu m^3$ or more results in the toner exhibiting an increased fixing latitude, the fixing latitude being the temperature region between the lowest fixing temperature and the hot offset temperature of the toner, whereby the upper limit of the offset temperature is shifted to from about 200° to about 250° C. with the lowest fixing temperature remaining unchanged.

6. The method for preparing an electrophotographic toner as claimed in claim 1, wherein controlling the kneading temperature to adjust the average particle volume of the polyalkylene to 0.05 $\mu m^3$ or more results in the toner exhibiting a fixing latitude of at least about 30° C.

7. The method for preparing an electrophotographic toner according to claim 1, wherein the kneading temperature is from 140° to 240° C.

8. The method for preparing an electrophotographic toner according to claim 1, wherein the kneading temperature is from 150° to 230° C.

9. The method for preparing an electrophotographic toner according to claim 1, wherein the average particle volume of the polyalkylene is adjusted to 0.1 $\mu m^3$ to 5 $\mu m^3$.

* * * * *

UNITED STATES PATENT AND TRADEMARK OFFICE

CERTIFICATE OF CORRECTION

PATENT NO. : 5,252,421

DATED : October 12, 1993

INVENTOR(S) : Masanori ICHIMURA et al.

It is certified that error appears in the above-indentified patent and that said Letters Patent is hereby corrected as shown below:

Claim 2, column 6, line 58, change "wight" to --weight--.

Claim 9, column 8, line 11, change "$\mu m$ $^3$" to --$\mu m^3$--.

Abstract, line 1, after "electrophotographic", insert --toner--.

Signed and Sealed this

Sixteenth Day of August, 1994

Attest:

Bruce Lehman

BRUCE LEHMAN

Attesting Officer

Commissioner of Patents and Trademarks